(12) United States Patent
Kaiser et al.

(10) Patent No.: US 11,752,701 B2
(45) Date of Patent: Sep. 12, 2023

(54) METHOD FOR PRODUCING AN ADHESIVE BOND AND SUPPORT PLATE FOR PRODUCING AN ADHESIVE BOND

(71) Applicant: ASM AMICRA Microtechnologies GmbH, Regensburg (DE)

(72) Inventors: Rudolf Kaiser, Lappersdorf (DE); Horst Lapsien, Regensburg (DE)

(73) Assignee: ASMPT AMICRA GmbH, Regensburg (DE)

( * ) Notice: Subject to any disclaimer, the term of this patent is extended or adjusted under 35 U.S.C. 154(b) by 0 days.

(21) Appl. No.: 17/597,913

(22) PCT Filed: Jul. 29, 2020

(86) PCT No.: PCT/EP2020/071364
§ 371 (c)(1),
(2) Date: Jan. 28, 2022

(87) PCT Pub. No.: WO2021/023592
PCT Pub. Date: Feb. 11, 2021

(65) Prior Publication Data
US 2022/0274348 A1  Sep. 1, 2022

(30) Foreign Application Priority Data
Aug. 2, 2019 (DE) ...................... 10 2019 120 954.4

(51) Int. Cl.
*B29C 65/48* (2006.01)
*B29C 65/14* (2006.01)
(Continued)

(52) U.S. Cl.
CPC ...... *B29C 65/4845* (2013.01); *B29C 65/1406* (2013.01); *B29C 65/1496* (2013.01);
(Continued)

(58) Field of Classification Search
CPC .............. B29C 65/4845; B29C 65/524; B29C 65/1496; B29C 65/782; B29K 2105/0097; B29K 2995/0026; B32B 37/1292
See application file for complete search history.

(56) References Cited

U.S. PATENT DOCUMENTS

| 5,433,810 | A | 7/1995 | Abrams |
| 2002/0092601 | A1* | 7/2002 | Sweeney, Jr. ............ B60J 10/34 |
| | | | 156/108 |

(Continued)

FOREIGN PATENT DOCUMENTS

| DE | 10 2006 001 885 A1 | 7/2007 |
| JP | 2004086010 A | 3/2004 |
| JP | 2012152677 A | 8/2012 |

OTHER PUBLICATIONS

German Patent and Trademark Office, Office Action, dated Jul. 12, 2022, 8 Pages.

*Primary Examiner* — Daniel McNally
(74) *Attorney, Agent, or Firm* — WELSH FLAXMAN & GITLER LLC

(57) ABSTRACT

The invention relates to a method for producing an adhesive bond between at least a first and a second, at least partially transparent planar component, in which the first component is laid onto a support plate, and an adhesive is applied to the first component at specified locations on the side of the first component facing away from the support plate, and the second component is laid onto the first component and is held parallel to the first component at a predefined distance, in such a way that the second component comes into contact with the adhesive on the first component.

23 Claims, 4 Drawing Sheets

(51) Int. Cl.
*B29C 65/52* (2006.01)
*B29C 65/78* (2006.01)
*B29K 105/00* (2006.01)

(52) U.S. Cl.
CPC .......... *B29C 65/524* (2013.01); *B29C 65/782* (2013.01); *B29K 2105/0097* (2013.01); *B29K 2995/0026* (2013.01)

(56) References Cited

U.S. PATENT DOCUMENTS

| | | | |
|---|---|---|---|
| 2006/0134994 A1* | 6/2006 | Yasuda | B29C 65/1654 439/676 |
| 2014/0178619 A1 | 6/2014 | Niiyama et al. | |

* cited by examiner

METHOD FOR PRODUCING AN ADHESIVE BOND AND SUPPORT PLATE FOR PRODUCING AN ADHESIVE BOND

BACKGROUND OF THE INVENTION

1. Technical Field

The invention relates to a method for producing an adhesive bond between at least a first and second, at least partially transparent plate-shaped component, in which the first component s laid onto a support plate, in which adhesive is applied to the first component at predetermined locations on the side of the first component facing away from the support plate, in which a second component is laid onto the first component and is held parallel to the first component at a predefined distance, namely in such a way that the second component comes into contact with the adhesive, which is present on the first component, and in which the adhesive is cured. The invention furthermore relates to a support plate for producing an adhesive bond between at least a first and second, at least partially transparent plate-shaped component according to the method according to the preceding description.

2. Description of the Related Art

Methods for producing an adhesive bond between two plate-shaped components are well known from the prior art. A method, which provides for a particularly high accuracy during the positioning of the components, is described, for example, in PCT Publication No. WO 2004/112100 A1, where the bonding device has a detection station, by means of which at least two sides of a component are detected with respect to their position and/or dimensions. For this purpose, the detection station preferably contains at least two camera systems for detecting a respective side of the component. When the components are positioned exactly, they are preferably connected to one another by means of laser soldering.

A device as well as a corresponding method for applying an adhesive, which can be cured by means of ultraviolet radiation, to a workpiece, is further known from Japanese Patent No. 2012-152677 A. The adhesive is applied to the workpiece along a line with a small line width and is subsequently cured at least on the edge side by means of application with UV light.

German Patent No. DE 10 2006 001 885 A1 relates to the use of a hot melt adhesive for fixing at least one micro component to a support for the construction of a detector module by means of a production method for fixing at least one micro component to a support. For this purpose, the hot melt adhesive is applied to a support, the micro component is positioned there at a predefined distance from the support and is fixed via the hot melt adhesive, namely a firm adhesive bond between the at least one micro component and the support is produced by means of cool-down of the hot glue.

However, the known methods are not very suitable for connecting two components, which are to be connected parallel to one another and at a predefined distance from one another. It must be ensured in this case, for example, that only very small or, at best, no tensions are introduced into the components, so that they maintain their flat structure. The high temperatures appearing during the laser soldering make the above-mentioned method unsuitable for this purpose.

SUMMARY OF THE INVENTION

It is the object of the present invention to provide a method for producing an adhesive bond between two plate-shaped components, which provides for a high accuracy during the positioning of the components, while hardly any or no tensions are introduced into the components during the adhering. It is furthermore the object of the present invention to provide a support plate, by which a method of this type can be carried out.

A method for producing an adhesive bond between at least a first and second, at least partially transparent plate-shaped component is proposed. The partially transparent plate-shaped components can be, for example, glass plates. In case these are adhered to one another parallel to one another and at a predefined distance from one another, they can be used, for example, in holographic glasses.

With the method, the first component is initially laid onto a support plate. On the side of the first component facing away from the support plate, adhesive is then applied to the first component at predetermined locations. If the first component is thus laid onto the support plate on the top, the adhesive is applied to the first component on the top. In a next step, the second component is laid onto the first component and is held parallel to the first component at a predefined distance. The exact positioning of the first component with respect to the second component is thereby determined by the planned use case of the components, which are adhered to one another. In the case that both components have the same size, it is often specified that the second component is positioned exactly over the first component. Also, the exact distance of the two components from one another is determined by the planned use case. To be able to produce an adhesive bond between the first component and the second component, the second component, when it is held parallel to the first component at a predefined distance therefrom, has to come into contact with the adhesive, which is present on the first component. For this purpose, it is required that the adhesive application to the first component was sufficiently large.

To cure the adhesive, light is applied thereto from the side of the support plate facing away from the components through the at least partially transparent support plate and through the first component. This means that when the first component lies on the support plate on the top, and the second component is held over the first component, the application with light takes place from the bottom. The intensity and duration of the light application required for curing the adhesive is thereby dependent on many factors, among others on the type and thickness of the adhesive, on the temperature, and on the spectrum of the light.

Due to the fact that the application with light takes place from the side of the support plate facing away from the components, the components can be held in the specified position and at the predefined distance from one another from the side of the support plate facing the components, without being negatively impacted by the light generation. The application with light furthermore provides for a curing of the adhesive without tensions being introduced into the components.

The support plate is preferably held in a plate holding frame. An exact positioning of the support plate can thus be achieved. In contrast to a firmly installed support plate, support plates can thereby also be exchanged, for example when an adhesive bond between other components is to be produced, whereby different components to be adhered usually require different support plates.

According to the invention, the first component is laid onto raised structures of the support plate. When the raised structures are small compared to the component, at least three raised structures are required in order to ensure a stable hold of the first component on the support plate. By laying the first component onto the raised structures of the support plate instead of onto an even surface, it is easier to achieve an even alignment, because the smallest contaminations between two flat surfaces are already sufficient to affect an incline of the first component with respect to the even alignment. A component laid onto raised structures of the support plate can furthermore also be lifted off the support plate more easily again after the adhesive bond has been produced, because better contact points exist and an adhesion of the first component on the support plate is at least largely avoided.

The adhesive is advantageously applied to the first component by a metering valve. The amount of the adhesive applied to the first component can thus be controlled accurately. Too little adhesive would possibly mean that the second component, if it is held at the predefined distance from the first component, does not come into contact with the adhesive at all, the adhesive bond would additionally possibly become too weak. Too much adhesive, in contrast, would require a longer time to cure and would enlarge the locations of the components, which are in contact with adhesive. The metering valve can thereby be displaced so that adhesive can be applied at any locations on the side of the first component facing away from the support plate.

It is advantageous when the predetermined locations, at which the adhesive is applied to the first component, are located in an edge region of the first component. The locations, at which adhesive was applied, can often not be used for the purpose, which the bonded components are to fulfill. An adhesive application in the edge region of the first component results in a large central region of the first component, to which no adhesive was applied, and which can be used for the desired purpose.

It is also advantageous when the adhesive is applied to the first component in the region of the raised structures of the support plate. It goes without saying that the raised structures of the support plate are then arranged at the location, at which the adhesive application is to take place. The regions, in which no adhesive application takes place, are thus also free from holding forces due to the raised structures of the support plate, and thus also free from local tensions caused by these holding forces.

At least the second component is advantageously held in a component holding frame by a handling unit. The second component can thus be positioned at the specified position and at the predefined distance from the first component by the handling unit and can be held until the adhesive has cured.

It is advantageous when, after laying the first component onto the support plate, the position of the first component is measured by a camera system. The camera system thereby has at least one camera, but can also have several cameras, in order to obtain an even higher accuracy. The photos taken by the cameras are preferably evaluated by an image processing software for accurately measuring the position of the first component. Prior to bringing the second component into contact with the adhesive, the position of the second component is measured by the camera system. The cameras used by the camera system can thereby be the same cameras or cameras other than those used during the measuring of the first component. The photos taken of the second component are also evaluated by an image processing software for accurately measuring the position of the second component. Based on the positions measured in this way, the second component is adjusted in such a way with respect to the first component that the relative positions correspond to the predetermined relative positions.

To obtain an even more accurate positioning of the second component with respect to the first component, a second measuring of the position of the second component, again by camera system and image processing software, can take place after the first adjustment of the second component. This newly determined position, in turn, is again compared to the predetermined position, and deviations, which may still be present, are once again eliminated by adjustment of the second component. If necessary, these steps can be repeated again several times.

It is also advantageous when the handling unit holding the component holding frame is aligned parallel to the support plate, whereby the alignment takes place manually optically and/or by sensors. Due to this alignment, the second component is aligned at least approximately parallel to the first component. A plane lying parallel to the support plate, in which the second component is moved for alignment with respect to the first component, is thereby furthermore specified for the handling unit. Finally, the plane also specifies a direction, which is perpendicular to this plane and in which the second component, after it has been aligned, is moved towards the first component.

The holding of the second component at a predefined distance from the first component advantageously takes place by spacers, which are attached to the first component and/or laid onto the first component. The spacers thereby have a thickness, which corresponds to the predefined distance, which is to be held between the first and the second component. If the second component is pressed onto the spacers, the predefined distance between the first and the second component arises. Spacers attached directly to the first component have already to be attached to the first component in a previous production step, and, for the most part, cannot be removed any longer after production of the adhesive bond. In return, spacers attached directly to the first component simplify the production of the adhesive bond, because they do not need to be handled separately. Spacers laid onto the first component, in contrast, have to be laid onto the first component by a separate handling unit prior to or after laying the first component onto the support plate. When the spacers protrude beyond the edge of the first component, they can, however, be removed from the components again after production of the adhesive bond.

In the alternative, it is advantageous when the holding of the second component at a predefined distance from the first component takes place by sensors, in particular optical sensors. Here, the handling unit only holds the second component via the component holding frame. The sensors are directed, for example, to one or preferably several locations of the edges of the first and second components, and measure the distance between the components, e.g., by an image processing software. Based on the measured distance, the handling unit holding the second component is controlled in such a way that the predefined distance is obtained. Differences between the distances measured at various locations of the edges show that the second component is not yet held parallel to the first component, and preferably lead to a correction by the handling unit.

It is also advantageous when the light applied to the adhesive is provided by a UV light source and/or a laser. UV light is thereby understood to be light with wavelengths in the range of from 100 nm to 380 nm. The exact wavelength of the required UV light is thereby dependent on the used adhesive. It is also conceivable to apply light from two light sources to the adhesive simultaneously or consecutively. When using a laser to apply light to the adhesive, it is possible to attain particularly high intensities of the light, and, associated therewith, to achieve a particularly quick curing of the adhesive.

The light is advantageously blocked by intransparent, i.e., light-impermeable, sections of the support plate in such a way that light is applied only to the regions of the first and second component, at which the adhesive is applied. The intransparent sections of the support plate can thereby be formed, for example, by a light-impermeable layer, in particular a chromium layer, which is applied to a base body of the support plate. As an alternative, a mask, in particular a metal mask, which is connected to the base body, can represent the intransparent sections of the support plate. To cure the adhesive, light has only to be applied to the regions of the first and second component, at which adhesive is applied as well. However, the light leads to a heating of the components at the locations, at which light is applied to them. Due to this heating, tensions can be created in the components. The light, in particular UV light, can furthermore also lead to a damage to the components. A limitation of the light to the region, at which adhesive is applied, reduces the possible tensions and damages.

It is also advantageous when, analogously to the production of the adhesive bond between the first component and the second component, an adhesive bond is produced between the second component and a further component. After the adhesive bond between the first and the second component has been produced, adhesive is thus applied to the second component at predefined locations. The further component is then laid onto the second component and is held parallel to the second component at a predefined distance. For curing, light is finally applied to the adhesive from the side of the support plate facing away from the components through the support plate, the first and the second component. Depending on the specified number of plate-shaped components, which are to be adhered, this method step can optionally be repeated for yet further components.

A support plate for producing an adhesive bond between at least a first and second, at least partially transparent plate-shaped component is furthermore proposed. The partially transparent plate-shaped components can be, for example, glass plates, wherein the glass plates, which are adhered to one another, can be used, for example, in holographic glasses.

The production of the adhesive bond thereby takes place according to the method according to the preceding description. The first component is thus in particular laid onto the support plate, and adhesive is applied to the first component on the side of the first component facing away from the support plate. The second component is then laid onto the first component and is held parallel to the first component at a predefined distance, namely in such a way that the second component comes into contact with the adhesive, which is present on the first component. For curing the adhesive, light is finally applied thereto from the side of the support plate facing away from the components through the support plate and through the first component.

The support plate is characterized in that it has a base body comprising raised structures, onto which the first component can be laid. If the raised structures are small compared to the component, at least three raised structures are required in order to ensure a stable hold of the first component on the support plate. By laying the first component onto the raised structures of the support plate instead of onto an even surface, it is easier to obtain an even alignment, because the smallest contaminations between two even surfaces are already sufficient to affect an incline of the first component with respect to the even alignment. A component laid onto raised structures of the support plate can furthermore also be lifted off the support plate more easily again after the adhesive bond has been produced, because better contact points exist and an adhesion of the first component on the support plate is at least largely avoided.

The support plate further comprises at least one transparent section and at least one intransparent, i.e., light-impermeable, section. The transparent section or the transparent sections, respectively, are at least located at the locations, at which adhesive is applied to the first component, so that light can be applied to the adhesive for curing from the side of the support plate facing away from the components through the transparent sections of the support plate and through the first component.

The intransparent sections of the support plate protect the regions of the components located behind it in the direction of irradiation of the light against the light and the heat development and/or damage to the material associated therewith. Transparent sections of the support plate are thus preferably arranged only at the specified locations, at which adhesive is applied to the first component, while the locations, at which no adhesive is applied to the first component, coincide with intransparent sections of the support plate.

The transparent sections are advantageously arranged in the region of the raised structures. The adhesive application onto the first component then preferably likewise takes place in the region of the raised structures. The regions, in which no adhesive application takes place, are thus also free from holding forces due to the raised structures of the support plate, and thus also free from local tensions caused by these holding forces.

It is advantageous when the raised structures are produced by etching of the locations, which are not raised. For this purpose, the locations, which are not to be etched, i.e., the locations, which later become the raised structures, are initially protected by a layer, for example a chromium layer. The non-protected region is then ablated in an etching process, and the protective layer is subsequently removed again. The application of the protective layer can thereby take place with high precision and thus leads to very precise raised structures.

It is also advantageous when the intransparent sections are formed by a light-impermeable layer, in particular a chromium layer, which is applied to the base body. Due to the fact that the light-impermeable layer is applied to the base body of the support plate and thus does not need to have any stability itself, it is possible to limit the thickness of the light-impermeable layer to the thickness, which is necessary for blocking the light, whereby the need for raw materials for the support plate is kept to a minimum.

As an alternative, it can be advantageous when the intransparent sections are formed by a mask, in particular a metal mask, which is connected to the base body. The mask is thereby initially produced in a separate production process, for example likewise in an etching process or by laser cutting. The mask is subsequently connected to the base body of the support plate, wherein positive, non-positive, or substance-to-substance bonds are conceivable. Due to the fact that the mask is produced separately, the base body of the support plate is not influenced, for example with regard to its flatness, during the production of the mask. Materials, in particular metals, which cannot be applied, or which can only be applied with more difficulty directly as layer to the base body of the support plate, can furthermore also be used for a separately produced mask.

The transparency and intransparency preferably refers to UV light. UV light is thereby understood to be light with wavelengths in the range of from 100 nm to 380 nm. The curing of many adhesives thereby takes place by UV light. The exact wavelength of the required UV light is thereby dependent on the used adhesive, whereby the transparent and intransparent sections of the support plate are transparent or intransparent, respectively, for the spectral range of the UV light, which is used. What is further proposed is an adhering device for producing an adhesive bond between at least a first and second, at least partially transparent plate-shaped component. The partially transparent plate-shaped components can be, for example, glass plates, whereby the glass plates, which are adhered to one another, can be used, for example, in holographic glasses.

The production of the adhesive bond thereby takes place according to the above-described method. For this purpose, the adhering device has a work plate, which extends along a work plane, and a base frame supporting this work plate. The work plate and the base frame can thereby be embodied in a variety of ways, but should be stable and low in vibration, in order to provide for a precise adhesion of the first with the second component.

The adhering device furthermore comprises a support plate, which is arranged on the work plate, or which can be arranged on the work plate and which is embodied according to the preceding description. The support plate is thereby preferably held in a plate holding frame. The first component can be laid onto the support plate. This takes place by a handling unit, which is designed for receiving, displacing, holding, and laying down the components. For this purpose, the component is preferably held by the handling unit in a component holding frame.

A displaceable metering valve of the adhering device is formed for applying adhesive to the first component. The displacement of the metering valve should thereby at least be possible in the work plane, preferably also perpendicular to the work plane, so that an adhesive application can take place at predefined locations of the first component. After adhesive application has taken place, the second component, which is received by the handling unit or by a further handling unit, is laid onto the first component and is held parallel to the first component at a predefined distance.

The adhering device also has a light source for applying light to the adhesive, which is applied to the first component. The adhering device is thereby characterized in that the light reaches the adhesive from the side of the support plate facing away from the components through the support plate and through the first component. This means that the light input takes place from underneath the support plate. Due to the application with light, the adhesive cures and produces an adhesive bond between the first and the second component, wherein the first and the second component are arranged parallel to one another and at a predefined distance from one another.

Due to the fact that the application with light takes place from the side of the support plate facing away from the components, the components can be held in the predetermined position and at the predefined distance from one another from the side of the support plate facing the components, without being negatively impacted by the light source. The application with light furthermore provides for a curing of the adhesive without tensions being introduced into the components.

The adhering device advantageously has a camera system for measuring the positions of the components. By this camera system and preferably an image processing software, the position of the first component is determined first, and then the position of the second component. Based on these positions, the second component is then adjusted with respect to the first component in such a way that the relative positions correspond to the predetermined relative positions.

It is also advantageous when the adhering device comprises sensors, in particular optical sensors, for measuring the distance between the first component and the second component. The handling unit thereby holds the second component via the component holding frame. The sensors are directed, for example, to one or preferably several locations of the edges of the first and second components, and measure the distance between the components, e.g., by an image processing software. Based on the measured distance, the handling unit holding the second component is controlled in such a way that the predefined distance is attained. Differences between the distances measured at various locations of the edges show that the second component is not yet held parallel to the first component, and preferably lead to a correction by the handling unit.

Finally, it is advantageous when the light source is a UV light source and/or a laser. UV light is thereby understood to be light with wavelengths in the range of from 100 nm to 380 nm. The exact wavelength of the required UV light is dependent on the used adhesive. When using a laser to apply light to the adhesive, it is possible to attain particularly high intensities of the light, and, associated therewith, to attain a particularly quick curing of the adhesive.

Further developments, advantages, and application possibilities of the invention also follow from the following description of exemplary embodiments and from the figures. All of the described and/or figuratively illustrated features are thereby generally subject matter of the invention, either alone or in any combination, regardless of the combination thereof in the claims or the dependency thereof. The content of the claims is also made a part of the description.

BRIEF DESCRIPTION OF THE DRAWINGS

The invention will be described in more detail below on the basis of exemplary embodiments in connection with the following drawings.

DETAILED DESCRIPTION OF THE INVENTION

Figure 1A:
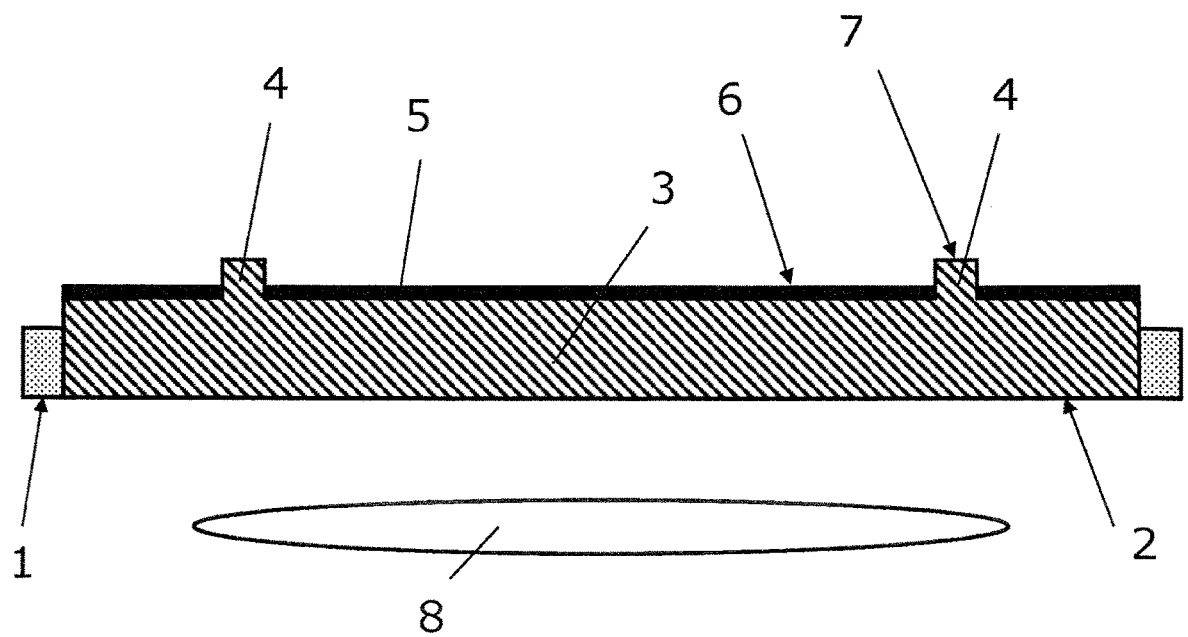
FIGS. 1a-1d show schematic cross sections through a support plate, a first and a second component during various steps of the production of an adhesive bond.

Identical reference numerals are used in the figures for elements of the invention, which are identical, or which act identically. For the sake of clarity, only reference numerals, which are required for the description of the respective figure, are illustrated in the individual figures.

FIG. 1a shows a schematic cross section through a support plate 2, which is held in a plate holding frame 1, for producing an adhesive bond between at least a first and second, at least partially transparent plate-shaped component. For example, the position and alignment of the support plate 2 can be adjusted via the plate holding frame 1.

The support plate 2 has a transparent, thus light-permeable, base body 3. The base body 3 is thereby formed in a plate-shaped manner, that is, it is a cuboid, in the case of which the height is much smaller than the length and the width.

Raised structures 4, onto which the first component is laid, are arranged on the top side of the base body 3 of the support plate 2. The raised structures 4 are thereby produced, for example, by an etching process. For this purpose, a protective layer, for example a chromium layer, is applied at the locations, at which the raised structures 4 shall be located. Then, from the unprotected locations it is etched away so much, until the height of the raised structures 4 above the base body 3 reaches a specified value. The protective layer is subsequently removed again.

A light-impermeable layer 5 is furthermore applied to the top side of the base body 3 of the support plate 2, namely at all locations of the top side, which do not have any raised structures. The light-impermeable layer 5 thus determines intransparent sections 6 of the support plate 2, while the raised structures 4 coincide with transparent sections 6 of the support plate 2.

Instead of the light-impermeable layer 5, the intransparent sections 6 can also be formed by a mask, in particular a metal mask, which is connected to the base body 3. The mask is thereby produced in a separate production process and is subsequently connected in a positive manner, non-positive manner and/or by a substance-to-substance bond to the base body 3 of the support plate 2.

A light source 8 is arranged underneath the support plate 2, thus on the side of the support plate 2 facing away from the raised structures 4. As an alternative, the light source 8 can also be arranged at another location, and optical elements, such as mirrors or optical waveguides can be provided, which guide the light from the light source 8 to the underside of the support plate 2.

Due to the fact that the light of the light source 8 serves the purpose of curing an adhesive applied between the first and the second component, the light source 8 is embodied as UV light source. UV light is thereby understood to be light with wavelengths in the range of from 100 nm to 380 nm. The exact spectrum of the light source 8 is dependent on the used adhesive, because, depending on the adhesive, light of a different wavelength is required to cure the adhesive.

Figure 1B:
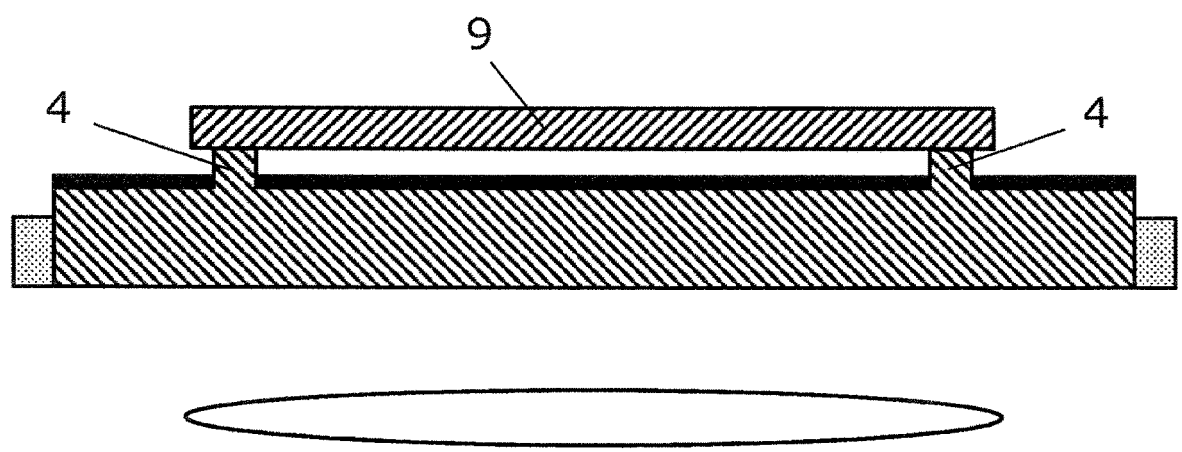

FIG. 1b shows a cross section through the support plate 2, after the first at least partially transparent plate-shaped component 9 was laid onto the raised structures 4 of the support plate 2 by a handling unit. The first component 9 can thereby in particular be a glass plate. Due to the fact that the first component 9 only bears on the raised structures 4 of the support plate 2, a stable, largely wobble-free position of the first component 9 is at hand. Force effects on the first component 9 also appear only in the region of the raised structures 4, so that the first component 9 is mostly free from tensions at all other locations.

Figure 1C:
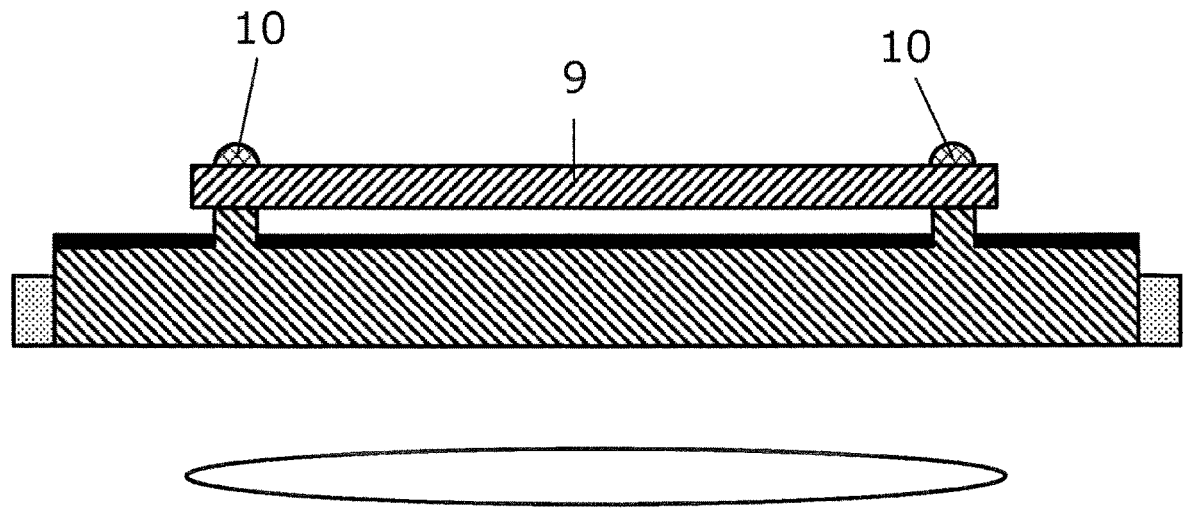

In the region of the transparent sections 7 of the support plate 2, adhesive 10 is applied to the side of the first component 9 facing away from the support plate 2 by a metering valve. The support plate 2 comprising the first component 9 and the applied adhesive 10 is shown in FIG. 1c.

Figure 1D:
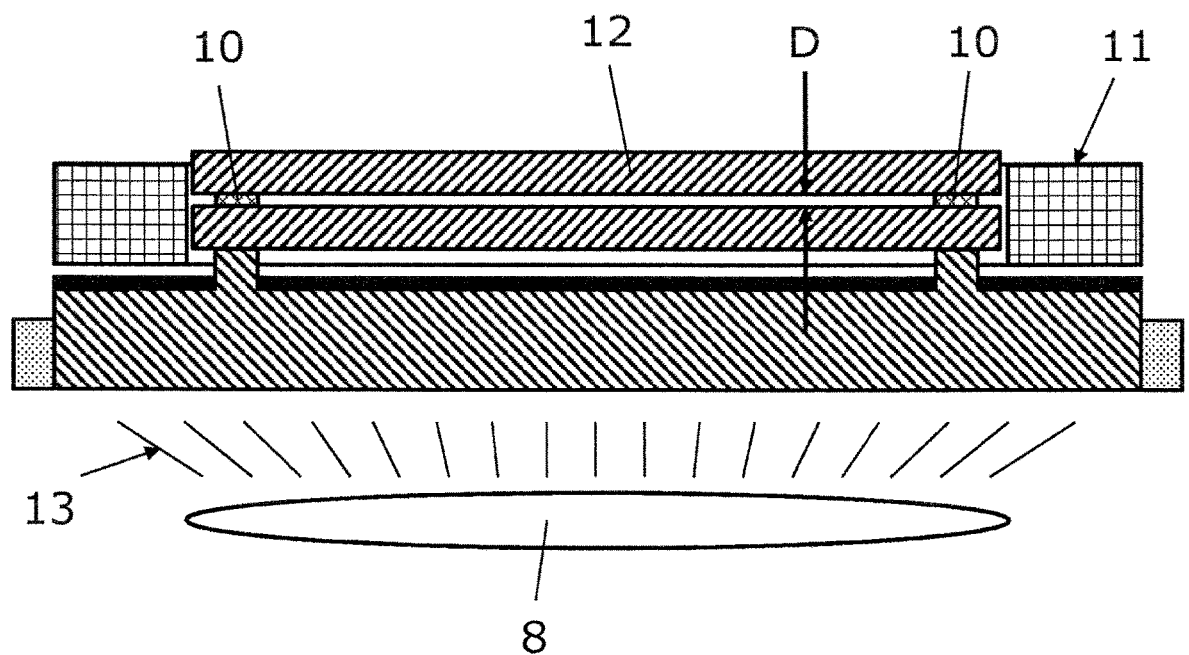

As shown in FIG. 1d, the second at least partially transparent plate-shaped component 12, which is held in a component holding frame 11, is subsequently laid onto the first component 9 by a handling unit, and is held parallel to the first component 9 at a predefined distance D. The second component 12 thereby also comes into contact with the adhesive 10.

The light source 8 is then turned on and applies light 13 to the adhesive 10. The path of the light 13 thereby runs from the light source 8 through the transparent sections 7 of the support plate 2 and through the first component 9 to the adhesive 10. The duration of the application of the adhesive 10 with light 13 is dependent on various factors, among others on the type of the adhesive 10, on the intensity of the light 13, on the thickness of the adhesive 10, and on the temperature.

Due to the fact that the light 13 is blocked by the intransparent sections 6 of the support plate 2, no application with light 13 occurs at those locations of the first component 9 and second component 12, at which no adhesive 10 is applied. A heating and a damage to the components 9 and 12 by the light 13 therefore also does not occur at the locations, at which no adhesive 10 is applied. Tensions in the components 9 and 12 are thus also reduced to a necessary minimum, so that the first component 9 and the second component 12 have a high degree of parallelism to one another. This is of major importance, for example, when the first and the second component 9 and 12 are glass plates, which are adhered to one another parallel to one another at a predefined distance D for the use in holographic glasses.

Figure 2:
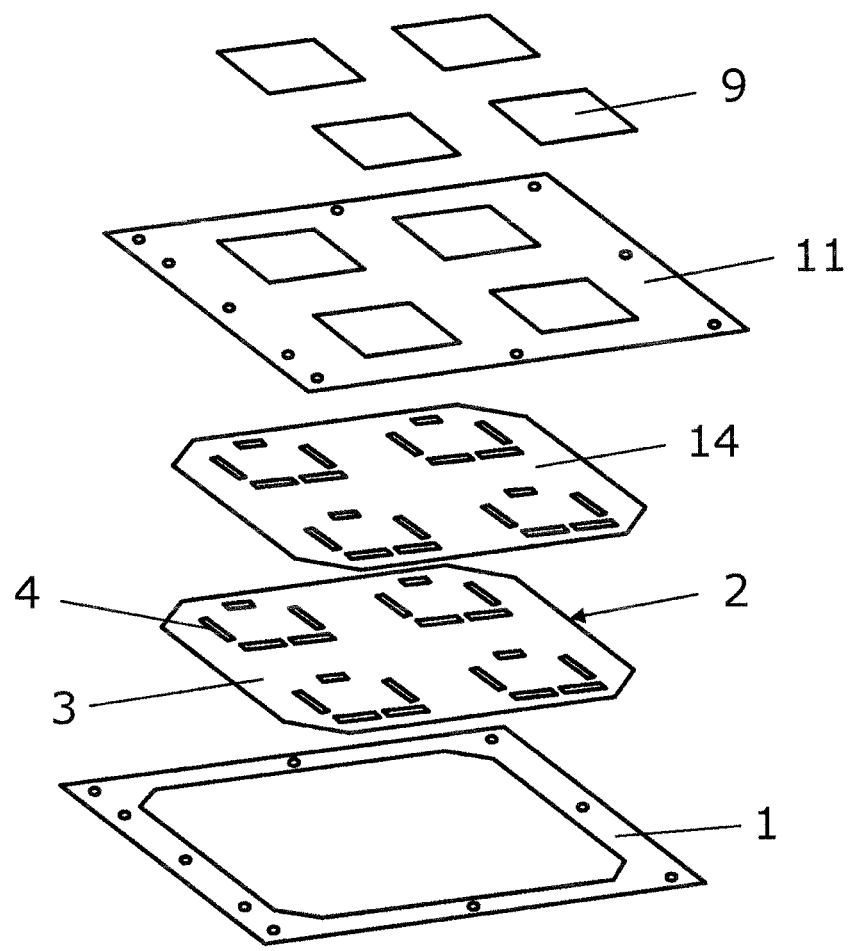
FIG. 2 shows a schematic exploded drawing of some parts used for producing an adhesive bond.

FIG. 2 shows a schematic exploded drawing of some parts, which are used for producing the adhesive bond. From the bottom to the top, this is initially the plate holding frame 1, in which the support plate 2 is held and by which the support plate 2 can be adjusted.

The support plate 2 has raised structures 4, wherein raised structures 4 are provided for holding four first components 9, so that four adhesive bonds can be produced at the same time. The raised structures 4 are thereby arranged so that they each come into contact with the first component 9 in an edge region of the first component 9.

A mask 14, in particular a metal mask, is laid onto the base body 3 of the support plate 2 and is connected to the base body 3. The mask 14 is light-impermeable and has recesses, which coincide with the raised structures 4 of the support plate 2. By these recesses, light 13 can be applied to the adhesive 11 from below through the support plate 2 and the first component 9.

The component holding frame 11, in which the first component 9 is received first and then the second component 12, comprises recesses for holding four first or second, respectively, components 9 or 12, respectively, so that a handling unit, which moves the component holding frame 11, can position four components 9 or 12 at the same time.

Finally, four first plate-shaped components 9, for which an adhesive bond can be produced at the same time, are also shown in FIG. 2. The four second plate-shaped components 12 are preferably identical or similar to the first components 9.

Figure 3:
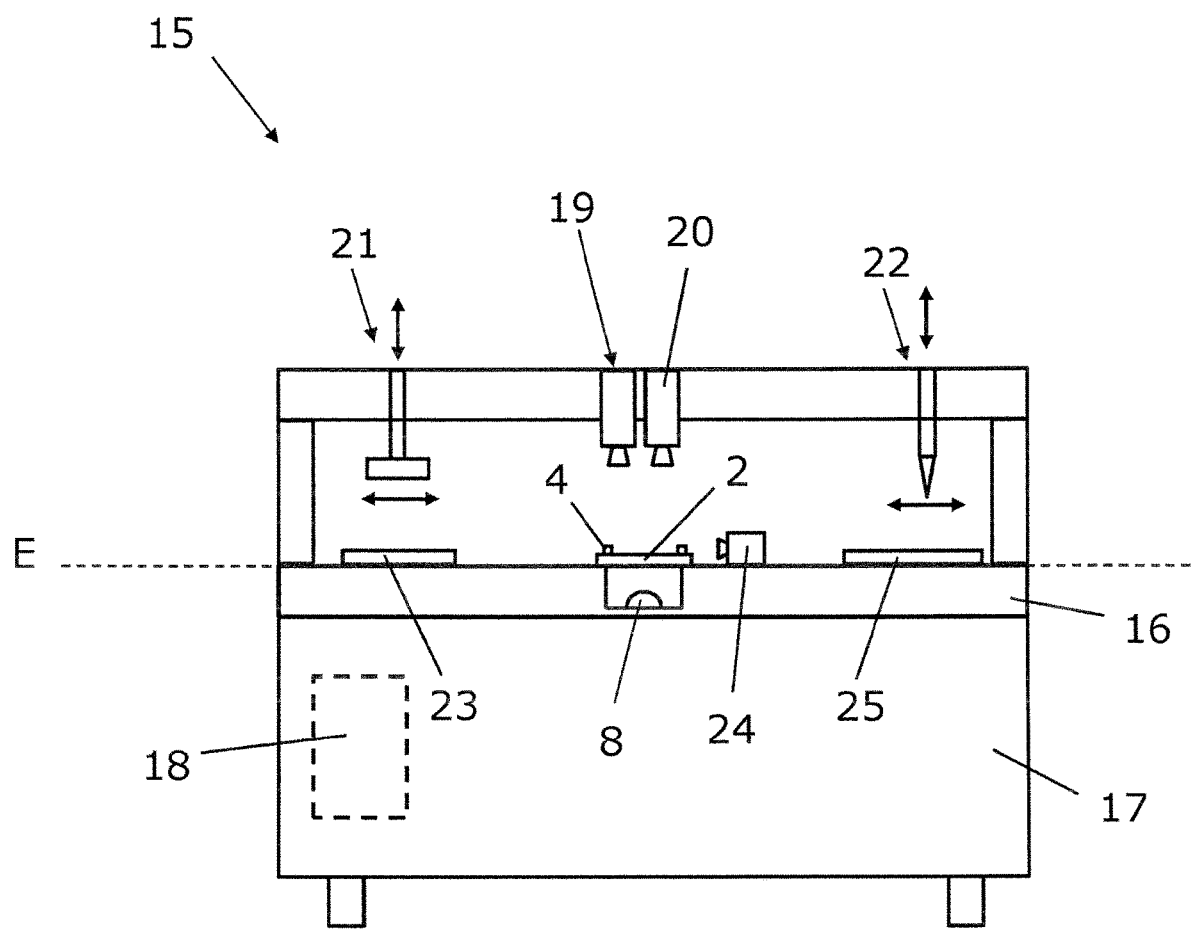
FIG. 3 shows a schematic side view of an adhering device.

FIG. 3 shows a schematic side view of an adhering device 15. The adhering device 15 comprises a work plate 16 and a base frame 17 supporting the work plate 16. The top side of the work plate 16 thereby defines a work plane E.

A support plate 2 comprising raised structures 4 is located centrally on the work plate 16, and a light source 8 is arranged underneath the support plate 2 in a recess of the work plate 16. A control unit 18 of the adhering device 15, which controls the units of the adhering device 15, is only indicated.

A camera system 19, here for example comprising two cameras 20, is arranged above the support plate 2. A handling unit 21 and a metering valve 22 for adhesive 10, which are displaceable in the work plane E and perpendicular to the work plane E, are moreover arranged above the work plate 16.

To produce an adhesive bond between two at least partially transparent plate-shaped components 9 and 12, the first component 9, which is held in the component holding frame 11, is initially received by a receiving station 23 by the handling unit 21, is moved to the support plate 2, and is laid down there. The exact position of the first component 9 is detected by the cameras 20 of the camera system 19 and is evaluated in the control unit 18 by an image processing software.

Adhesive 10 is subsequently applied to the first component 9 at predetermined locations by the metering valve 22. The second component 12, which is likewise held in the component holding frame 11, is then received by the receiving station 23 by the handling unit 21 and is moved to the support plate 2. Before the second component 12 is laid down onto the first component 9, it is detected by the cameras 20 of the camera system 19 and is evaluated in the control unit 18 by the image processing software. The measured position of the second component 12 is compared to the measured position of the first component 9 and—if necessary—the position of the second component 12 is corrected by the handling unit 21.

The second component 12 is then laid down onto the first component 9 and is held parallel to the first component 9 at a distance D from the first component 9. This distance D is measured by a sensor 24, illustrated here as optical sensor, which is arranged close to the support plate 2 and which is directed towards the edges of the components 9 and 12. The handling unit 21 then moves the second component 12 in such a way that the distance D between the first and second component 9 and 12 corresponds to a predetermined distance D.

As soon as the second component 12 is aligned correctly, the light source 8 is turned on, and light 13 is applied to the adhesive 10 for curing from the underside of the support plate 2 through the support plate 2 and through the first component 9.

After a predefined duration, the light source 8 is turned off again, and the components 9 and 12, which are adhered to one another, are transported to a delivery station 25 by the handling unit 21. The next components 9 and 12 can then be adhered to one another.

LIST OF REFERENCE NUMERALS 1 plate holding frame
2 support plate
3 base body
4 raised structures
5 light-impermeable layer
6 intransparent section
7 transparent section
8 light source
9 first component
10 adhesive
11 component holding frame
12 second component
13 light
14 mask
15 adhering device
16 work plate
17 base frame
18 control unit
19 camera system
20 camera
21 handling unit
22 metering valve
23 receiving station
24 sensor
25 delivery station
D distance
E work plane

The invention claimed is:

1. A method for producing an adhesive bond between at least a first at least partially transparent plate-shaped component and a second at least partially transparent plate-shaped component, comprising the steps of:
    laying the first component onto an at least partially transparent support plate;
    applying an adhesive to the first at least partially transparent component at predetermined locations on a side of the first at least partially transparent component facing away from the at least partially transparent support plate;
    laying the second at least partially transparent component onto the first at least partially transparent component; and
    holding the second at least partially transparent component parallel to the first at least partially transparent component at a predefined distance in such a way that the second at least partially transparent component comes into contact with the adhesive, which is present on the first at least partially transparent component, wherein, to cure the adhesive, light is applied thereto from a side of the at least partially transparent support plate facing away from the first at least partially transparent component and the second at least partially transparent component through the at least partially transparent support plate and through the first at least partially transparent component, wherein the first at least partially transparent component is laid onto raised structures of the at least partially transparent support plate.

2. The method according of claim 1, wherein the support plate has a partially transparent light permeable base body comprising raised structures onto which the first at least partially transparent component can be laid, and wherein the at least partially transparent support plate has at least one intransparent section.

3. The method according to claim 2, wherein transparent sections of the at least partially transparent support plate are arranged in a region of the raised structures.

4. The method according to claim 2, wherein the raised structures are produced by etching locations which are not raised.

5. The method according to claim 2, wherein the intransparent sections are formed by a light-impermeable layer applied to the base body.

6. The method according to claim 2, wherein the intransparent sections are formed by a mask which is connected to the base body.

7. The method according to claim 2, wherein transparency and intransparency refers to UV light.

8. The method according to claim 1, wherein at least the second at least partially transparent component is held in a component holding frame by a handling unit.

9. The method according to claim 8, wherein the handling unit holding the component holding frame is aligned parallel to the at least partially transparent support plate, wherein an alignment takes place manually optically and/or by sensors.

10. The method according to claim 1, wherein the at least partially transparent support plate is held in a plate holding frame.

11. The method according to claim 1, wherein the adhesive is applied to the first at least partially transparent component by a metering valve.

12. The method according to claim 1, wherein the adhesive is applied to the first at least partially transparent component in an edge region of the first at least partially transparent component.

13. The method according to claim 1, wherein the adhesive is applied to the first at least partially transparent component in a region of the raised structures of the at least partially transparent support plate.

14. The method according to claim 1, wherein after laying the first at least partially transparent component onto the at least partially transparent support plate, a position of the first at least partially transparent component is measured by a camera prior to bringing the second at least partially transparent component into contact with the adhesive, the position of the second at least partially transparent component is measured by the camera, and the second at least partially transparent component is adjusted with respect to the first at least partially transparent component on the basis of the measured positions.

15. The method according to claim 1, wherein the holding of the second at least partially transparent component at a predefined distance from the first at least partially transparent component takes place by spacers, which are attached to the first at least partially transparent component and/or laid onto the first at least partially transparent component.

16. The method according to claim 1, wherein the holding of the second component at a predefined distance from the first at least partially transparent component takes place by sensors.

17. The method according to claim 1, wherein the light applied to the adhesive is provided by a UV light source and/or a laser.

18. The method according to claim 1, wherein the light is blocked by intransparent sections of the at least partially transparent support plate in such a way that light is applied only to regions of the first at least partially transparent component and the second at least partially transparent component, at which the adhesive is applied.

19. The method according to claim 1, wherein an adhesive bond is produced between the second at least partially transparent component and a further at least partially transparent component.

20. An adhering device for producing an adhesive bond between at least a first at least partially transparent component and second at least partially transparent component, according to the method according to claim 1, having a work plate extending along a work plane, and a base frame supporting this work plate, an at least partially transparent support plate having a base body comprising raised structures onto which the first at least partially transparent component can be laid, wherein the at least partially transparent support plate has at least one intransparent section, which is arranged on the work plate and onto which the first at least partially transparent component can be laid, a handling unit for receiving, displacing, holding, and laying down the first at least partially transparent component and the second at least partially transparent component, a displaceable metering valve for applying adhesive to the first at least partially transparent component, and a light source for applying light to the adhesive applied to the first at least partially transparent component from a side of the at least partially transparent support plate facing away from the first at least partially transparent component and second at least partially transparent component through the at least partially transparent support plate and through the first at least partially transparent component.

21. The adhering device according to claim 20, further comprises a camera for measuring the positions of the first at least partially transparent component and second at least partially transparent component.

22. The adhering device according to claim 21, wherein the adhering device comprises sensors for measuring the distance between the first at least partially transparent component and the second at least partially transparent component.

23. The adhering device according to claim 20, wherein the light source is a UV light source and/or a laser.

* * * * *